US006868056B1

(12) United States Patent
Sudo

(10) Patent No.: US 6,868,056 B1
(45) Date of Patent: Mar. 15, 2005

(54) APPARATUS AND METHOD FOR OFDM COMMUNICATION

(75) Inventor: Hiroaki Sudo, Yokohama (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 692 days.

(21) Appl. No.: 09/635,096

(22) Filed: Aug. 9, 2000

(30) Foreign Application Priority Data

Sep. 7, 1999 (JP) .......................... 11-253633

(51) Int. Cl.[7] .............................................. H04J 11/00
(52) U.S. Cl. ..................................... 370/210; 375/325
(58) Field of Search .................................. 370/210, 203, 370/342, 343, 344, 484, 482, 481; 375/324, 325, 206, 208, 260, 349

(56) References Cited

U.S. PATENT DOCUMENTS

| | | | | |
|---|---|---|---|---|
| 5,488,638 A | * | 1/1996 | Kazecki et al. | 375/347 |
| 5,517,530 A | * | 5/1996 | Gardner | 375/325 |
| 5,745,005 A | * | 4/1998 | Natsumi | 329/311 |
| 5,764,690 A | * | 6/1998 | Blanchard et al. | 375/147 |
| 5,862,132 A | * | 1/1999 | Blanchard et al. | 370/342 |
| 5,862,192 A | * | 1/1999 | Huszar et al. | 375/347 |
| 5,914,985 A | * | 6/1999 | Ishizu | 375/326 |
| 5,920,599 A | * | 7/1999 | Igarashi | 375/341 |
| 5,959,965 A | * | 9/1999 | Ohkubo et al. | 370/203 |
| 6,038,250 A | * | 3/2000 | Shou et al. | 375/143 |
| 6,038,264 A | * | 3/2000 | Uesugi | 375/316 |
| 6,259,721 B1 | * | 7/2001 | Uesugi et al. | 375/130 |
| 6,295,311 B1 | * | 9/2001 | Sun | 375/147 |
| 6,359,875 B1 | * | 3/2002 | Hamada et al. | 370/342 |
| 6,452,936 B1 | * | 9/2002 | Shiino | 370/441 |
| 6,452,964 B1 | * | 9/2002 | Yoshida | 375/222 |
| 6,563,865 B1 | * | 5/2003 | Usui | 375/222 |
| 6,594,320 B1 | * | 7/2003 | Sayeed | 375/281 |
| 6,654,340 B1 | * | 11/2003 | Jones et al. | 370/208 |

OTHER PUBLICATIONS

Satoshi Muneta et al., "Coherent Detection Scheme Switching Between RLS and SFD–IE for OFDM" (in Japanese), NTT Wireless System Laboratories, B–5–11, p. 362, w/partial translation thereof (in English).*

Takahiro ASAI et al., "A Study on Differential Coding for Orthogonal Frequecy Division Multiplexing" (in Japanese), Faculty of Engineering, Kyoto University, B–440, p. 441, w/partial translation thereof (in English).*

Satoshi Muneta et al., "Coherent Detection Scheme Switching Between RLS and SFD–IE for OFDM" (in Japanese), NTT Wireless System Laboratories, B–5–11, p. 362, w/partial translation thereof (in English).

Takahiro Asai et al., "A Study of Differential Coding for Orthogonal Frequency Division Multiplexing" (in Japanese), Faculty of Engineering, Kyoto University, B–440, p. 441. w/partial translation thereof (in English).

* cited by examiner

*Primary Examiner*—Frank Duong
*Assistant Examiner*—Michael J. Moore, Jr.
(74) *Attorney, Agent, or Firm*—Stevens, Davis, Miller & Mosher, LLP

(57) ABSTRACT

The OFDM reception apparatus according to the present invention comprising:
  FFT processor for performing a FFT processing on a reception signal;
  a plurality of demodulators capable of performing mutually different demodulation processes on the FFT-processed reception signal; and
  a selector for selecting, among the plurality of demodulators, a demodulator that should perform the demodulation process on the FFT-processed reception signal according to a factor that influences the quality of a demodulated signal and letting the selected demodulator perform the demodulation process.

14 Claims, 4 Drawing Sheets

APPARATUS AND METHOD FOR OFDM COMMUNICATION

BACKGROUND OF THE INVENTION

1. Field of the Invention

The present invention relates to a communication apparatus based on an OFDM (Orthogonal Frequency Division Multiplexing) system.

2. Description of the Related Art

A conventional OFDM-based communication apparatus generally uses coherent detection or delay detection as a demodulation system. First, a conventional OFDM communication apparatus that carries out coherent detection will be explained with reference to FIG. 1. FIG. 1 is a block diagram showing a configuration of a conventional OFDM communication apparatus that carries out coherent detection.

In the transmission system in FIG. 1, a transmission signal is subjected to QPSK modulation processing for every subcarrier by QPSK modulation section 41. The transmission signal subjected to QPSK modulation is subjected to IFFT (inverse Fourier transform) processing and thereby frequency-division multiplexed by IFFT section 42. The transmission signal subjected to IFFT processing is transmitted via antenna 43.

The signal transmitted via antenna 43 has a frame configuration as shown in FIG. 2. FIG. 2 is a schematic diagram showing a frame format used for the conventional OFDM communication apparatus. As shown in FIG. 2, the signal transmitted via antenna 43 is configured by preamble section 51, pilot symbol section 52 and message section 53 in an old-to-new time sequence. Each signal with this frame configuration is sent carried on one packet.

In the reception system in FIG. 1, the signal sent from the other end of communication is received via antenna 43. Here, the other end of communication above has the same configuration as that shown in FIG. 1 and the signal sent from this other end of communication is subjected to the same processing as that in the transmission system described above.

The signal received via antenna 43 is subjected to FFT (Fourier transform) processing by FFT section 44. Thus, a signal carried by each subcarrier is extracted. The signal extracted by FFT section 44 is subjected to coherent detection processing by coherent detection section 45. In this way, a demodulated signal is extracted.

Here, the coherent detection processing carried out by coherent detection section 45 will be explained with reference to FIG. 3. FIG. 3 is a block diagram showing an internal configuration of coherent detection section 45 in the conventional OFDM transmission apparatus that carries out coherent detection.

Coherent detection section 45 performs transmission path estimation using a pilot symbol in the reception signal and performs coherent detection processing by carrying out transmission path compensation on the reception signal using the transmission path estimation information obtained.

In FIG. 3, the reception signal (RX1) is sent to complex multiplication section 62, level detection section 63 and multiplication section 65 via switching section 61. This reception signal (RX1) is the signal extracted from FFT section 44 shown in FIG. 1.

Here, the reception signal (RX1) is expressed in the following expression:

$$RX1 = R1 \times e^{j\theta 1} \times TX \quad (1)$$

where, R1 is an amplitude variation due to fading, etc. and θ 1 is a phase variation due to fading, etc. and TX is a signal transmitted from the other end of communication (transmission signal).

Moreover, the signal in the pilot section of the reception signal expressed in expression (1) above, that is, the reception signal (RXP1) in the pilot section is expressed in the following expression:

$$RXP1 = R1 \times e^{j\theta 1} \times \text{Pilot} \quad (2)$$

where, Pilot is a pilot symbol.

Complex multiplication section 62 estimates a transmission path characteristic by carrying out complex multiplication processing using the reception signal (RX1) and pilot symbol (Pilot). That is, a transmission path characteristic (Profile1) as shown in the following expression is obtained by multiplying the reception signal (RXP1) in the pilot symbol section expressed in expression (2) above by a conjugate complex number (Pilot*) of the pilot symbol (Pilot).

$$\text{Profile1} = R1 \times e^{j\theta 1} \times \text{Pilot} \times \text{Pilot}^* = R1 \times e^{j\theta 1} \times |\text{Pilot}|^2 \quad (3)$$

where, if $|\text{Pilot}|^2 = 1$, expression (3) above can be expressed in the following expression:

$$\text{Profile1} = R1 \times e^{j\theta 1} \quad (4)$$

The transmission path characteristic (Profile1) obtained is sent to division section 64.

On the other hand, level detection section 63 calculates reception power of the reception signal (RX1). The reception power of the reception signal (RX1) is $R1^2$ from expression (1) above. The reception power of the reception signal (RX1) is sent to division section 64.

Division section 64 performs the following division processing using the transmission path characteristic (Profile1) from complex multiplication section 62 and the reception power from level detection section 63.

$$Pfifile1/R1^2 = e^{j\theta 1}/R1 \quad (5)$$

The result of the division processing in division section 64 is sent to multiplication section 65.

Multiplication section 65 performs transmission path compensation on the reception signal using the result of the division processing in division section 64. That is, a demodulated signal is obtained by multiplying the reception signal (RX1) from switching section 61 by the conjugate complex number in expression (5) above as shown in the following expression:

$$RX1 \times e^{-j\theta 1}/R1 = R1 \times e^{j\theta 1} \times TX \times e^{-j\theta 1}/R1 = TX \quad (6)$$

Then, a conventional OFDM communication-apparatus that carries out delay detection will be explained with reference to FIG. 4. FIG. 4 is a block diagram showing a configuration of an OFDM communication apparatus that carries out delay detection. The OFDM communication apparatus shown in FIG. 4 has a configuration including DQPSK modulation section 71 and delay detection section 72 instead of QPSK modulation section 41 and coherent detection section 45 in FIG. 1. As a frame format, the one shown in FIG. 2 can be used.

DQPSK modulation section 71 performs differential coding QPSK modulation (generally referred to as "DQPSK modulation") on the transmission signal. Delay detection section 72 performs delay detection processing on the reception signal (RX1) by multiplying the signal at the current time by the signal preceding by 1 OFDM symbol. Through this multiplication processing, a demodulated signal is obtained.

However, the conventional OFDM communication apparatus above has problems as shown below. That is, in the conventional OFDM communication apparatus that carries out coherent detection, when the communication speed of one packet is slower than the channel variation speed, the channel condition at the time of reception of the pilot symbol section in each packet differs from the channel condition at the time of reception of the message section of the packet above. Thus, transmission path compensation is performed on the message section above using the transmission path characteristic estimated by the pilot symbol section above, and therefore the error rate characteristic of the demodulated signal obtained in the message section above deteriorates a great deal.

On the other hand, the conventional OFDM communication apparatus that carries out delay detection outputs the result of multiplying the signal at the current time by the signal preceding by 1 OFDM symbol as a demodulated signal, and therefore an error caused by a transmission path variation included in this demodulated signal is only 1 OFDM symbol. Thus, if the communication speed of one packet is slower than the channel variation speed, deterioration of the error rate characteristic of the demodulated signal is small.

On the other hand, in the conventional OFDM communication apparatus that carries out delay detection, the noise component superimposed on the demodulated signal doubles by multiplying the signal at the current time by the signal preceding by 1 OFDM symbol, and therefore if the communication speed of one packet is sufficiently faster than the channel variation speed, the error rate characteristic of the demodulated signal deteriorates compared to the conventional OFDM communication apparatus that carries out coherent detection.

As shown above, in the conventional OFDM communication apparatuses above, the error rate characteristic of the demodulated signal may deteriorate depending on the relationship between the communication speed of one packet and channel variation speed.

SUMMARY OF THE INVENTION

It is an object of the present invention to provide an OFDM communication apparatus that will suppress deterioration of the error rate characteristic of the demodulated signal. This object is attained by the reception system performing demodulation processing on the reception signal according to factors that influence the quality of the demodulated signal. Furthermore, this object is attained by the transmission system performing modulation processing on the transmission signal according to the demodulation processing carried out by the other end of communication.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, embodiments of the present invention will be explained in detail below.

(Embodiment 1)

Figure 6:
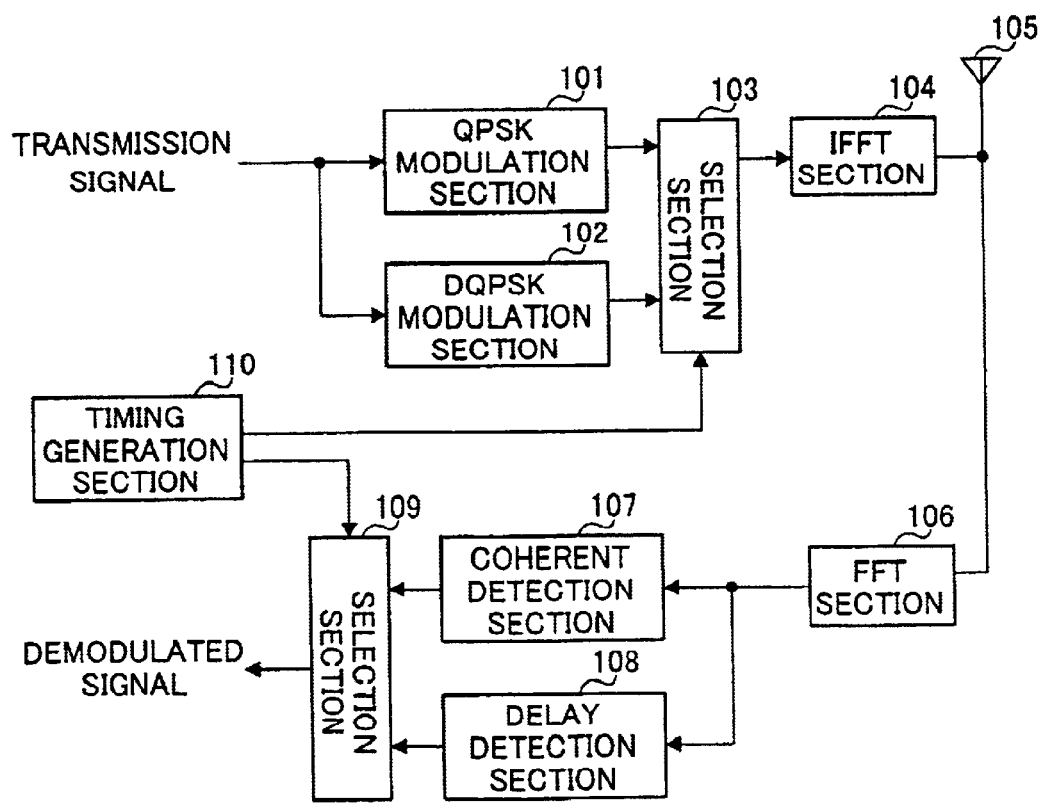
FIG. 6 is a block diagram showing a configuration of an OFDM communication apparatus according to Embodiment 1 of the present invention.

FIG. 6 is a block diagram showing a configuration of an OFDM communication apparatus according to Embodiment 1 of the present invention. In the transmission system in FIG. 6, a transmission signal is sent to QPSK modulation section 101 and DQPSK modulation section 102. QPSK modulation section 101 performs QPSK modulation on the transmission signal above for every subcarrier. The QPSK-modulated transmission signal is output to selection section 103.

DQPSK modulation section 102 performs DQPSK modulation on the transmission signal above. The DQPSK-modulated transmission signal is output to selection section 103.

Selection section 103 receives, as an input, a control signal from timing generation section 110 as to which signal should be output to IFFT section 104, the signal from QPSK modulation section 101 or the signal from DQPSK modulation section 102. That is, when the communication speed of one packet is sufficiently faster than the channel variation speed, timing generation section 110 outputs to selection section 103 a control signal instructing that the signal from QPSK modulation section 101 should be output to IFFT section 104. On the contrary, when the communication speed of one packet is slower than the channel variation speed, timing generation section 110 outputs a control signal instructing that the signal from DQPSK modulation section 102 should be output to IFFT section 104. Here, the communication speed of one packet refers to a speed when the apparatus on the transmitting side transmits one packet and the apparatus on the receiving side completes the reception of this packet.

Here, the relationship between the channel variation speed used in timing generation section 110 and communication speed of one packet can be decided from, for example, the quality (error rate characteristic, etc.) of a demodulated signal output from selection section 109 of the reception system, which will be described later.

Selection section 103 outputs either the signal from QPSK modulation section 101 or the signal from DQPSK modulation section 102 to IFFT section 104 based on the control signal from timing generation section 110.

IFFT section 104 performs IFFT processing on the signal sent from selection section 103. In this way, the signal sent from selection section 103 is frequency-division multiplexed and sent to the other end of communication via antenna 105.

Figure 1:
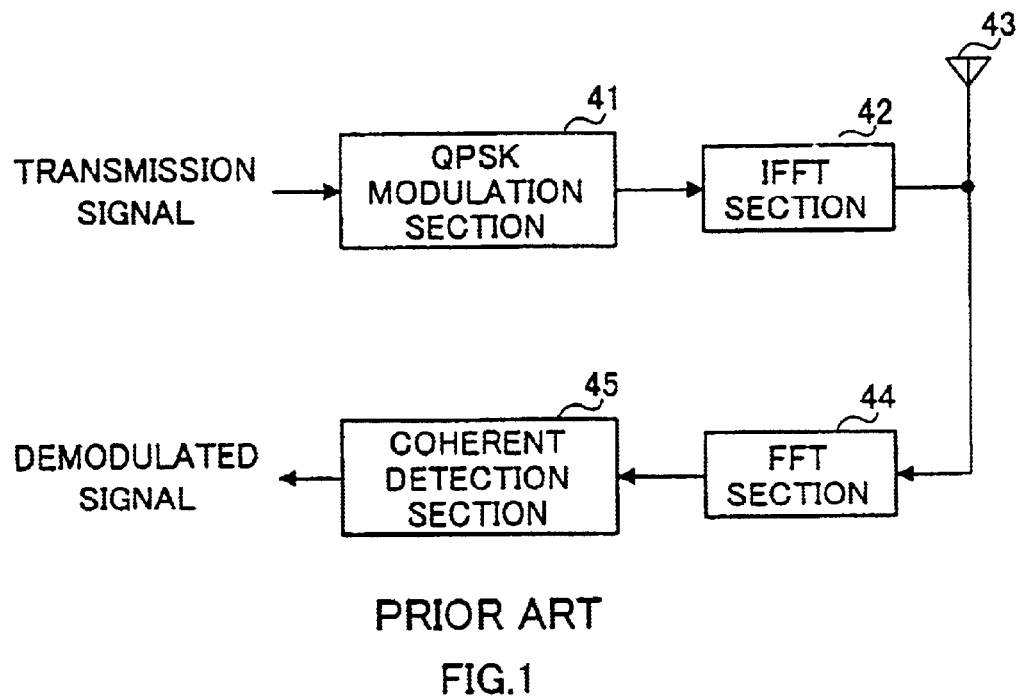
FIG. 1 is a block diagram showing a configuration of a conventional OFDM communication apparatus that carries out coherent detection.
Figure 2:
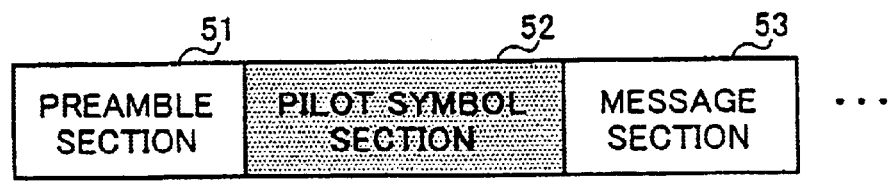
FIG. 2 is a schematic diagram showing a frame format used by an OFDM communication apparatus.
Figure 3:
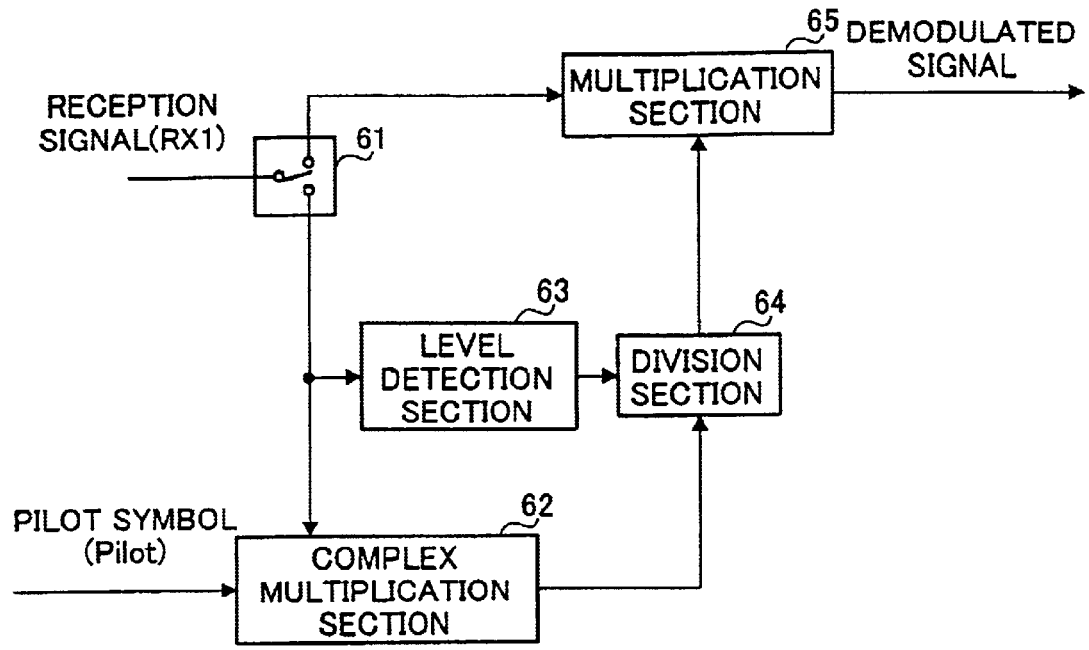
FIG. 3 is a block diagram showing an internal configuration of a coherent detection section of the conventional OFDM communication apparatus that carries out coherent detection.
Figure 4:
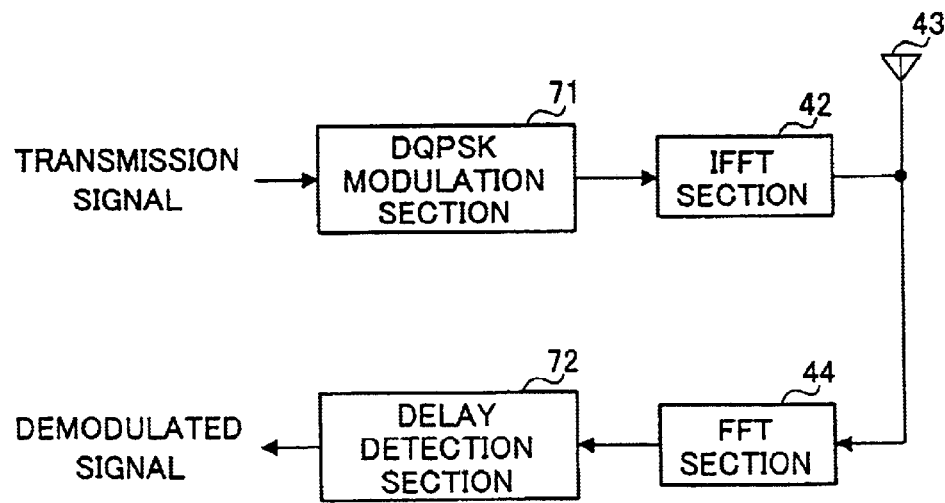
FIG. 4 is a block diagram showing a configuration of a conventional OFDM communication apparatus that carries out delay detection.
Figure 5:
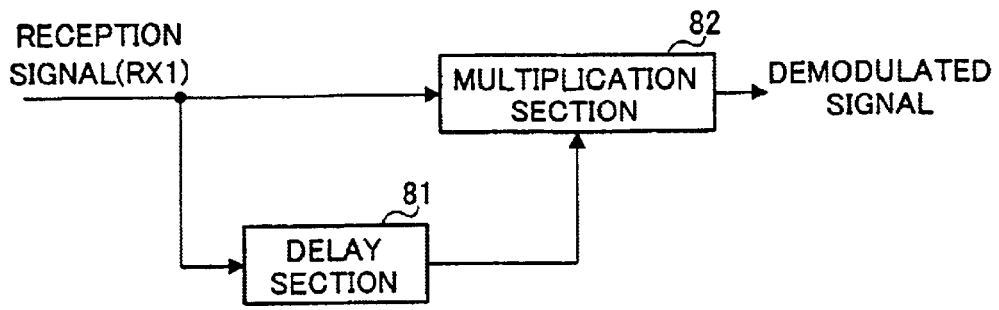
FIG. 5 is a block diagram showing an internal configuration of a delay detection section of the conventional OFDM communication apparatus that carries out delay detection.

The frame configuration of the signal sent via antenna 105 is as shown in FIG. 2 referred to previously. Each signal with the frame configuration shown in FIG. 2 is sent carried on one packet.

In the reception system in FIG. 6, the signal sent from the other end of communication is received via antenna 105. Here, the other end of communication has the same configuration as that shown in FIG. 6 and the signal sent from this other end of communication is subjected to the same processing as that in the transmission system described above.

The signal received via antenna 105 is subjected to FFT processing by FFT section 106. In this way, the signal sent through each subcarrier is extracted and output to coherent detection section 107 and delay detection section 108.

Coherent detection section 107 performs coherent detection processing on the signal extracted by FFT section 106 and extracts a demodulated signal. Delay detection section 108 performs delay detection processing on the signal extracted by FFT section 106 and extracts a demodulated signal. Both the demodulated signal extracted from coherent detection section 107 and demodulated signal extracted from delay detection section 108 are output to selection section 109.

Selection section 109 receives, as an input, a control signal from timing generation section 110 as to which signal should be output as the demodulated signal, the signal from coherent detection section 107 or the signal from delay detection section 108. More specifically, when the communication speed of one packet is sufficiently faster than the channel variation speed (when a QPSK-modulated signal from the other end of communication via antenna 105 is received via antenna 105), timing generation section 110 outputs a control signal instructing that a signal from coherent detection section 107 should be output to IFFT section 104 as the demodulated signal. On the contrary, when the communication speed of one packet is slower than the channel variation speed (when the signal DQPSK-modulated from the other end of communication is received via antenna 105), timing generation section 110 outputs a control signal instructing that a signal from delay detection section 108 should be output as the demodulated signal.

Selection section 109 outputs either the signal from coherent detection section 107 or signal from delay detection section 108 as the demodulated signal based on the control signal from timing generation section 110. In this way, when the communication speed of one packet is sufficiently faster than the channel variation speed, the reception signal is subjected to coherent detection processing and a demodulated signal is extracted. On the contrary, when the communication speed of one packet is slower than the channel variation speed, the reception signal is subjected to delay detection processing and a demodulated signal is extracted.

As shown above, according to this embodiment, the reception system performs demodulation processing of either coherent detection processing or delay detection processing on the reception signal according to whether the communication speed of one packet is faster or slower than the channel variation speed, that is, the relationship between the communication speed of one packet and the channel variation speed. This makes it possible to suppress deterioration of the error rate characteristic of the demodulated signal. Furthermore, the transmission system performs modulation processing (QPSK modulation or DQPSK modulation) corresponding to the demodulation processing carried out by the other end of communication on the transmission signal, and therefore the other end of communication above can reliably suppress deterioration of the error rate characteristic of the demodulates signal.

This embodiment describes the case where the reception system uses two kinds of demodulation system, coherent detection and delay detection, while the transmission system uses two kinds of modulation system, QPSK modulation and DQPSK modulation, but the present invention is not limited to this and is also applicable when both reception system and transmission system use 3 or more types of demodulation system and modulation system, respectively. For example, it is possible to use BPSK modulation or 8PSK modulation, etc. as the modulation system for the transmission system to allow the reception system to carry out delay detection processing.

Furthermore, this embodiment describes the case where a relationship between the communication speed of one packet and channel variation speed is used as the selection criteria of the demodulation system for the reception system and modulation system for the transmission system. But it goes without saying that the present invention is not limited to this, and it is also applicable to cases where simply the communication speed of one packet (length of one packet), channel variation speed or various factors that have influence on the quality of a demodulated signal (error rate characteristic, etc.) in the reception system are used as the selection criteria.

(Embodiment 2)

Embodiment 2 provides a mode of further reducing the scale of hardware by configuring the coherent detection section and delay detection section in Embodiment 1 with a single circuit. The OFDM communication apparatus according to this embodiment will be explained with reference to FIG. 7 and FIG. 8 below.

Figure 7:
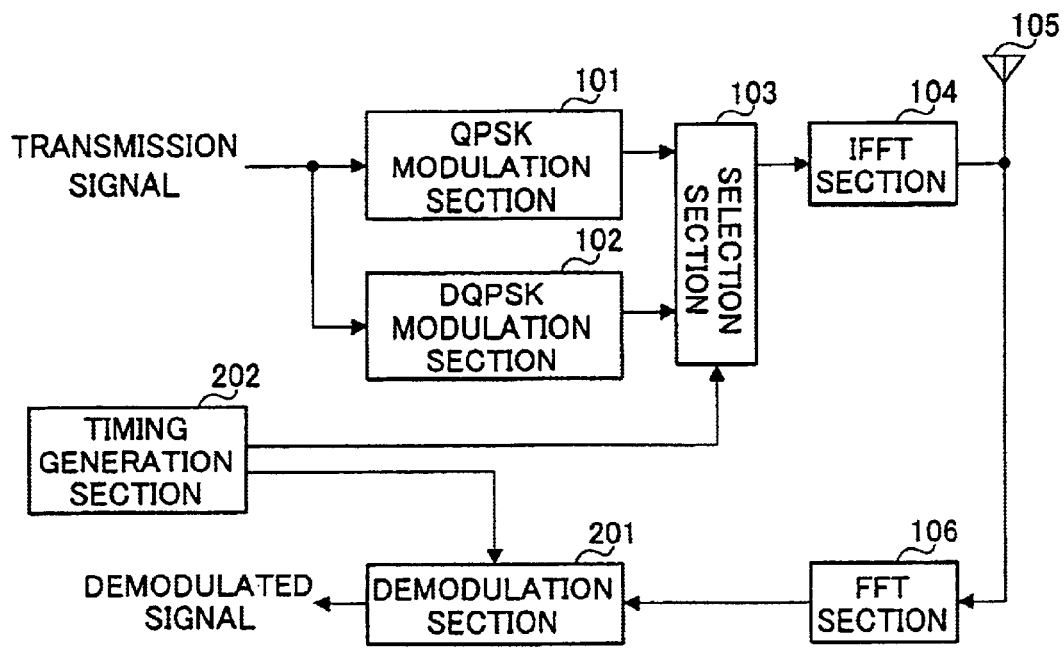
FIG. 7 is a block diagram showing a configuration of an OFDM communication apparatus according to Embodiment 2 of the present invention.
Figure 8:
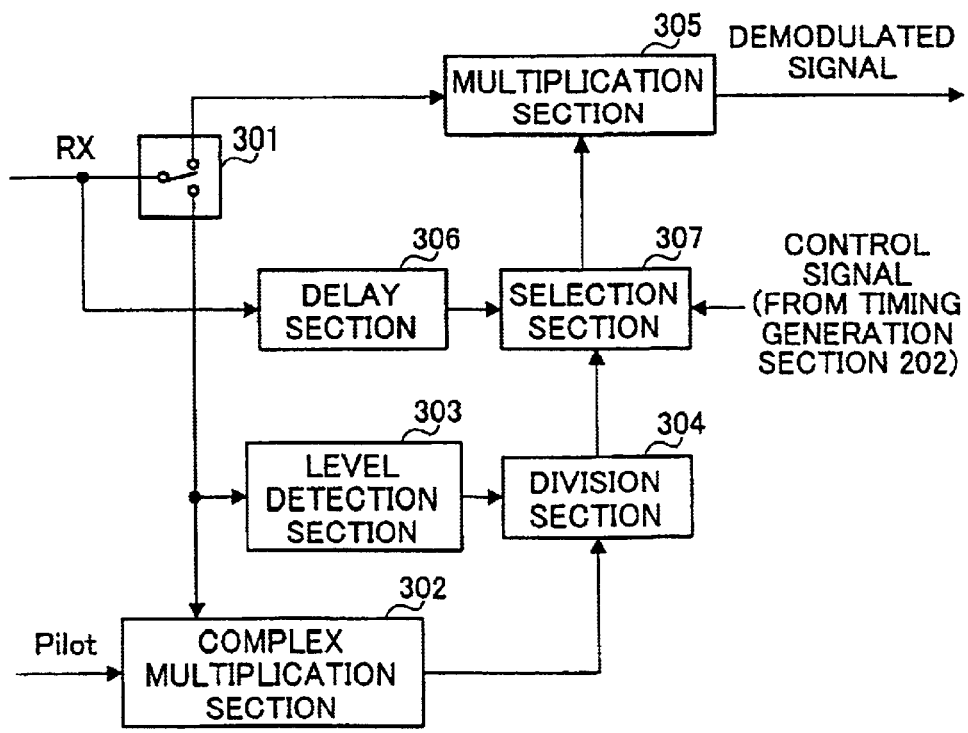
FIG. 8 is a block diagram showing an internal configuration of a demodulation section of the OFDM communication apparatus according to Embodiment 2 of the present invention.

FIG. 7 is a block diagram showing a configuration of the OFDM communication apparatus according to Embodiment 2 of the present invention. FIG. 8 is a block diagram showing an internal configuration of the demodulation section of the OFDM communication apparatus according to Embodiment 2 of the present invention. The parts in FIG. 7 with the same configuration as that in Embodiment 1 (FIG. 6) are assigned the same reference numerals as those in FIG. 6 and their detailed explanations will be omitted.

In FIG. 7, when a QPSK-modulated signal is received from the other end of communication via antenna 105, timing generation section 202 outputs a control signal instructing that the signal extracted from FFT section 106 should be subjected to coherent detection processing to demodulation section 201. When a DQPSK-modulated signal is received from the other end of communication via antenna 105, timing generation section 202 outputs a control signal instructing that the signal extracted from FFT section 106 should be subjected to delay detection processing to demodulation section 201.

Demodulation section 201 carries out demodulation processing of either coherent detection processing or delay detection processing on the signal extracted by FFT section 106 based on the control signal from timing generation section 202. That is, when the communication speed of one packet is sufficiently faster than the channel variation speed, demodulation section 201 performs coherent detection processing on the signal extracted by FFT section 106, and on the contrary, when the communication speed of one packet is slower than the channel variation speed, demodulation section 201 performs delay detection processing on the signal extracted by FFT section 106.

Then, the internal configuration of demodulation section 201 will be explained with reference to FIG. 8. In FIG. 8, a reception signal (RX) is sent via switching section 301 to complex multiplication section 302, level detection section 303 and multiplication section 305. This reception signal (RX) is the signal extracted by FFT section 106 shown in FIG. 7.

Complex multiplication section 302 performs complex multiplication processing using the reception signal (RX) and a pilot symbol (Pilot) to estimate a transmission path characteristic. The estimated transmission path characteristic is sent to division section 304.

On the other hand, level detection section 303 calculates the reception power of the reception signal (RX). This reception power is sent to division section 304.

Division section 304 carries out division processing using the transmission path characteristic from complex multiplication section 302 and reception power from level detection section 303. The result of this division processing is sent to selection section 307.

On the other hand, delay section 306 delays the reception signal (RX) by 1 OFDM symbol and then sends the reception signal to selection section 307.

Selection section 307 selects either the signal from delay section 306 or the signal from division section 304 as the output signal to multiplication section 305 based on the control information from timing generation section 202. That is, when the control signal from timing generation section 202 is a control signal instructing that coherent detection processing should be carried out, selection section 307 selects the signal from division section 304 as the output signal to multiplication section 305. On the contrary, when the control signal from timing generation section 202 is a control signal instructing that delay detection processing should be carried out, selection section 307 selects the signal from delay section 306 as the output signal to multiplication section 305.

Multiplication section 305 multiplies the reception signal (RX) by the signal selected by selection section 307. In this way, when the control signal from timing generation section 202 is a control signal instructing that coherent detection processing should be carried out, transmission path compensation for the reception signal is carried out using the estimated transmission path estimation information. Moreover, when the control signal from timing generation section 202 is a control signal instructing that delay detection processing should be carried out, multiplication processing is carried out between the signal at the current time and the signal 1 OFDM symbol ahead and thereby delay detection processing is carried out on the reception signal (RX).

Thus, according to this embodiment, it is possible to further reduce the scale of hardware compared to Embodiment 1 by configuring the coherent detection section and delay detection section with a single circuit.

The OFDM communication apparatus according to the embodiment described above can be mounted on a communication terminal apparatus or base station apparatus in a digital mobile communication system.

① The OFDM reception apparatus according to the present invention adopts a configuration comprising FFT processor for performing FFT processing on a reception signal;

a plurality of demodulator capable of performing mutually different demodulation processes on the FFT-processed reception signal; and selector for selecting, among said plurality of demodulator, a demodulator that should perform the demodulation process on said FFT-processed reception signal according to a factor that influences the quality of a demodulated signal and letting the selected demodulator perform the demodulation process.

According to this configuration, demodulation processing on the reception signal is selected according to the factors that influence the quality of the demodulated signal, and therefore it is possible to suppress deterioration of the error rate of the demodulated signal.

② The OFDM reception apparatus according to the present invention adopts such a configuration that the selector uses a relationship between the communication speed of one packet and channel variation speed as a factor that influences the quality of the demodulated signal.

According to this configuration, demodulation processing on the reception signal is selected according to the relationship between the communication speed of one packet and channel variation speed, and therefore it is possible to maintain the error rate characteristic of the demodulated signal in optimal conditions regardless of the length of one packet or channel variation speed.

③ The OFDM reception apparatus according to the present invention adopts such a configuration that the demodulation processes carried out by the plurality of demodulator are coherent detection processing or delay detection processing.

According to this configuration, demodulation processing of either coherent detection processing or delay detection processing is carried out on the reception signal according to factors that influence the quality of the demodulated signal, for example according to the relationship between the communication speed of one packet and channel variation speed, and therefore it is possible to reliably suppress deterioration of the error rate characteristic of the demodulated signal. ④ The OFDM transmission apparatus according to the present invention adopts a configuration comprising modulator for performing modulation processing corresponding to demodulation processing performed by an OFDM reception apparatus on a transmission signal; and IFFT processor for performing IFFT processing on ④ the modulated transmission signal;

said OFDM reception apparatus comprising:

FFT processor for performing FFT processing on a reception signal;

a plurality of demodulator capable of performing mutually different demodulation processes on the FFT-processed reception signal; and selector for selecting, among said plurality of demodulator, a demodulator that should perform the demodulation process on said FFT-processed reception signal according to factor that influences the quality of a demodulated signal and letting the selected demodulator perform the demodulation process.

According to this configuration, modulation processing is carried out on the transmission signal according to the demodulation processing performed by the other end of communication, and therefore the other end of communication can reliably suppress deterioration of the error rate characteristic of the demodulated signal.

(5) The OFDM communication apparatus according to the present invention adopts a configuration including an OFDM reception apparatus comprising:

FFT processor for performing FFT processing on a reception signal;

a plurality of demodulator capable of performing mutually different demodulation processes on the FFT-processed reception signal; and selector for selecting, among said plurality of demodulator, a demodulator that should perform the demodulation process on said FFT-processed reception signal according to factor that influences the quality of a demodulated signal and letting the selected demodulator perform the demodulation process, and an OFDM transmission apparatus comprising:

modulator for performing modulation processing corresponding to the demodulation processing performed by said OFDM reception apparatus on a transmission signal; and IFFT processor for performing IFFT processing on the modulated transmission signal.

According to this configuration, it is possible to provide an OFDM communication apparatus that suppresses deterioration of the error rate characteristic of the demodulated signal.

(6) The communication terminal apparatus according to the present invention adopts a configuration equipped with an OFDM communication apparatus, said OFDM communication apparatus including an OFDM reception apparatus comprising:

FFT processor for performing FFT processing on a reception signal;

a plurality of demodulator capable of performing mutually different demodulation processes on the FFT-processed reception signal; and selector for selecting, among said plurality of demodulator, a demodulator that should perform the demodulation process on said FFT-processed reception signal according to factor that influences the quality of a demodulated signal and letting the selected demodulator perform the demodulation process; and an OFDM transmission apparatus comprising:

modulator for performing modulation processing corresponding to the demodulation processing performed by said OFDM reception apparatus on a transmission signal; and IFFT processor for performing IFFT processing on the modulated transmission signal.

This configuration comprises an OFDM communication apparatus that suppresses deterioration of the error rate characteristic of the demodulated signal, and therefore can provide a communication terminal apparatus capable of executing optimal communications.

(7) The base station apparatus according to the present invention adopts a configuration equipped with an OFDM communication apparatus, said OFDM communication apparatus including an OFDM reception apparatus comprising:

FFT processor for performing FFT processing on a reception signal;

a plurality of demodulator capable of performing mutually different demodulation processes on the FFT-processed reception signal; and selector for selecting, among said plurality of demodulator, a demodulator that should perform the demodulation process on said FFT-processed reception signal according to factor that influences the quality of a demodulated signal and letting the selected demodulator perform the demodulation process; and an OFDM transmission apparatus comprising:

modulator for performing modulation processing corresponding to the demodulation processing performed by said OFDM reception apparatus on a transmission signal; and IFFT processor for performing IFFT processing on the modulated transmission signal.

This configuration comprises an OFDM communication apparatus that suppresses deterioration of the error rate characteristic of the demodulated signal, and therefore can provide a communication terminal apparatus capable of executing optimal communications.

(8) The OFDM communication method according to the present invention adopts a method comprising the FFT step of performing FFT processing on a reception signal; and the demodulating step of performing, among a plurality of demodulation processes, a demodulation process corresponding to factor that influences the quality of a modulated signal.

According to this method of the present invention, demodulation processing on the reception signal is selected according to the factors that influence the quality of the demodulated signal, and therefore it is possible to suppress deterioration of the error rate of the demodulated signal.

(9) The OFDM communication method according to the present invention adopts a method with the demodulating step using a relationship between the communication speed of one packet and channel variation speed as a factor that influences the quality of a demodulated signal.

According to this method, demodulation processing on the reception signal is selected according to the relationship between the communication speed of one packet and channel variation speed, and therefore it is possible to maintain the error rate characteristic of the demodulated signal in optimal conditions regardless of the length of one packet or channel variation speed.

Selection of coherent detection or delay detection according to the channel variation speed can also be applied to a single carrier system. However, since delay detection performs a multiplication between the current symbol and the immediately preceding symbol, interference between codes increases in a multi-path environment. Thus, applying delay detection to the single carrier system causes characteristic deterioration due to interference between codes to increase a great deal. Thus, in the case where the present invention is applied to the single carrier system, an optimal error rate characteristic irrespective of the channel variation speed may not always be obtained.

On the other hand, the OFDM system can prevent interference between codes even in a multi-path environment by inserting a guard interval for every symbol. Thus, applying selection of coherent detection or delay detection according to the channel variation speed to an OFDM system can obtain an optimal error rate characteristic regardless of the channel variation speed.

As described above, the present invention performs demodulation processing according to factors that influence the quality of a demodulated signal, and therefore can provide an OFDM communication apparatus that suppresses deterioration of the error rate characteristic of the demodulated signal.

The present invention is not limited to the above described embodiments, and various variations and modifications may be possible without departing from the scope of the present invention.

This application is based on the Japanese Patent Application No.HEI 11-253633 filed on Sep. 7, 1999, entire content of which is expressly incorporated by reference herein.

What is claimed is:

1. A radio reception apparatus, comprising:
   a demodulator that performs selectively (i) coherent detection of a received signal and (ii) delay detection of the received signal; and
   a selector that selects one of said coherent detection and said delay detection to be applied to the received signal by said demodulator according to: (a) a relationship between a communication speed of a packet and a channel variation speed, (b) the length of the packet, or (c) said channel variation speed.

2. A radio transmission apparatus, comprising:
   a modulator that performs (i) a first modulation and (ii) a second modulation of a transmission signal to produce a first modulated signal and a second modulated signal, respectively, said first modulation corresponding to coherent detection and said second modulation corresponding to delay detection; and
   a selector th at selects one of said first and second modulated signals for transmission by said radio transmission apparatus, wherein:
   said selector selects between said first and second modulated signals according to: (a) a relationship between a communication speed of a packet and a channel variation speed, (b) the length of the packet, or (c) said channel variation speed.

3. A radio transmission apparatus, comprising:
   a modulator; and
   a selector;
   wherein said modulator performs selectively (i) a first modulation corresponding to coherent detection and (ii) a second modulation corresponding to delay detection, respectively, with respect to a signal to be output by said selector for transmission; and
   wherein said selector selects between said first modulation and said second modulation with respect to said signal to be output by said selector for transmission, according to: (a) a relationship between a communication speed of a packet and a channel variation speed, (b) the length of the packet, or (c) said channel variation speed.

4. A communication terminal apparatus, comprising the radio reception apparatus of claim 1.

5. A communication terminal apparatus, comprising the radio transmission apparatus of claim 2.

6. A communication terminal apparatus, comprising the radio transmission apparatus of claim 3.

7. A communication terminal apparatus, comprising: a radio reception apparatus comprising a demodulator that performs selectively (i) coherent detection of a received signal and (ii) delay detection of a received signal; and a selector that selects one of said coherent detection and said delay detection to be applied to the received signal by said demodulator according to: (a) a relationship between a communication speed of a packet and a channel variation speed, (b) the length of the packet, or (c) said channel variation speed; and
   the radio transmission apparatus of claim 2.

8. A communication terminal apparatus, comprising:
   a radio reception apparatus comprising a demodulator that performs selectively (i) coherent detection of a received signal and (ii) delay detection of a received signal; and a selector that selects one of said coherent detection and said delay detection to be applied to the received signal by said demodulator according to: (a) a relationship between a communication speed of a packet and a channel variation speed, (b) the length of the packet, or (c) said channel variation speed; and
   the radio transmission apparatus of claim 3.

9. A base station apparatus, comprising the radio reception apparatus of claim 1.

10. A base station apparatus, comprising the radio transmission apparatus of claim 2.

11. A base station apparatus, comprising the radio transmission apparatus of claim 3.

12. A base station apparatus, comprising:
   a radio reception apparatus comprising a demodulator that performs selectively (i) coherent detection of a received signal and (ii) delay detection of a received signal; and a selector that selects one of said coherent detection and said delay detection to be applied to the received signal by said demodulator according to: (a) a relationship between a communication speed of a packet and a channel variation speed, (b) the length of the packet, or (c) said channel variation speed; and
   the radio transmission apparatus of claim 2.

13. A base station apparatus, comprising:
   a radio reception apparatus comprising a demodulator that performs selectively (i) coherent detection of a received signal and (ii) delay detection of a received signal; and a selector that selects one of said coherent detection and said delay detection to be applied to the received signal by said demodulator according to: (a) a relationship between a communication speed of a packet and a channel variation speed, (b) the length of the packet, or (c) said channel variation speed; and
   the radio transmission apparatus of claim 3.

14. A radio reception method, comprising:
   (a) performing selectively coherent detection and delay detection of a received signal; and
   (b) selecting one of said coherent detection and delay detection to be applied to the received signal in step (a) according to: (i) a relationship between a communication speed of a packet and a channel variation speed, (ii) the length of the packet, or (iii) said channel variation speed.

* * * * *